(12) United States Patent
Kritzer et al.

(10) Patent No.: US 10,283,787 B2
(45) Date of Patent: May 7, 2019

(54) SEALING FRAME FOR A REDOX-FLOW BATTERY ELECTRODE MODULE

(71) Applicant: Carl Freudenberg KG, Weinheim (DE)

(72) Inventors: Peter Kritzer, Forst (DE); Olaf Nahrwold, Ludwigshafen (DE); Olivier Jeanne, Saint Junien (FR); Susanne Zils, Darmstadt (DE)

(73) Assignee: Carl Freudenberg KG, Weinheim (DE)

( * ) Notice: Subject to any disclaimer, the term of this patent is extended or adjusted under 35 U.S.C. 154(b) by 698 days.

(21) Appl. No.: 14/270,998

(22) Filed: May 6, 2014

(65) Prior Publication Data

US 2014/0363748 A1     Dec. 11, 2014

(30) Foreign Application Priority Data

Jun. 10, 2013    (DE) ..................... 10 2013 009 629.4

(51) Int. Cl.
| | |
|---|---|
| *H01M 8/0273* | (2016.01) |
| *H01M 2/08* | (2006.01) |
| *H01M 4/86* | (2006.01) |
| *H01M 8/18* | (2006.01) |
| *H01M 8/24* | (2016.01) |
| *H01M 8/0276* | (2016.01) |
| *H01M 8/04276* | (2016.01) |
| *H01M 8/06* | (2016.01) |

(Continued)

(52) U.S. Cl.
CPC ....... *H01M 8/0273* (2013.01); *H01M 4/8605* (2013.01); *H01M 8/0276* (2013.01); *H01M 8/04283* (2013.01); *H01M 8/0693* (2013.01); *H01M 8/188* (2013.01); *H01M 8/20* (2013.01); *H01M 8/246* (2013.01); *H01M 8/0284* (2013.01); *H01M 8/0297* (2013.01); *Y02E 60/528* (2013.01)

(58) Field of Classification Search
None
See application file for complete search history.

(56) References Cited

U.S. PATENT DOCUMENTS

| | | | | |
|---|---|---|---|---|
| 1,470,883 A | * | 10/1923 | Schuh ................. | C25C 7/02 204/281 |
| 2,868,712 A | * | 1/1959 | Deprez ................. | C25B 11/02 204/225 |

(Continued)

FOREIGN PATENT DOCUMENTS

| | | |
|---|---|---|
| EP | 1284513 A1 | 2/2003 |
| JP | 2000260460 A * | 9/2000 |

(Continued)

OTHER PUBLICATIONS

Kanno, Machine Translation of JP2006324129; 20 pages total.*

(Continued)

*Primary Examiner* — Ula C Ruddock
*Assistant Examiner* — Anna Korovina
(74) *Attorney, Agent, or Firm* — Harness, Dickey & Pierce, P.L.C.

(57) ABSTRACT

An electrode module for a redox flow battery, includes an electrode (1) and a sealing frame (2), mechanically connected so that the electrode module that results therefrom can be used with no problems in redox flow cells.

3 Claims, 8 Drawing Sheets

(51) Int. Cl.
*H01M 8/20* (2006.01)
*H01M 8/0284* (2016.01)
*H01M 8/0297* (2016.01)

(56) References Cited

U.S. PATENT DOCUMENTS

| | | | | |
|---|---|---|---|---|
| 3,101,285 | A * | 8/1963 | Tantram | H01M 4/8626 |
| | | | | 429/514 |
| 3,297,484 | A * | 1/1967 | Niedrach | H01M 8/08 |
| | | | | 429/485 |
| 3,875,040 | A * | 4/1975 | Weltin | C25B 9/02 |
| | | | | 204/254 |
| 3,915,836 | A | 10/1975 | Born et al. | |
| 4,045,325 | A * | 8/1977 | Schwickart | C25B 9/02 |
| | | | | 204/256 |
| 4,264,686 | A * | 4/1981 | Frank | H01M 4/86 |
| | | | | 429/231.8 |
| 6,149,810 | A * | 11/2000 | Gonzalez-Martin | B01D 53/22 |
| | | | | 204/252 |
| 6,284,109 | B1 * | 9/2001 | Ebert | C25C 7/04 |
| | | | | 204/279 |
| 6,423,439 | B1 * | 7/2002 | Barton | H01M 8/0271 |
| | | | | 429/509 |
| 6,815,114 | B1 * | 11/2004 | Bronold | C25B 9/10 |
| | | | | 428/192 |
| 2003/0162066 | A1 * | 8/2003 | Shiraishi | H01M 8/0267 |
| | | | | 429/437 |
| 2004/0191623 | A1 * | 9/2004 | Kubata | H01M 8/188 |
| | | | | 429/189 |
| 2005/0136317 | A1 * | 6/2005 | Ferguson | H01M 8/0221 |
| | | | | 429/457 |
| 2007/0039815 | A1 * | 2/2007 | Bartel | C01B 3/08 |
| | | | | 204/242 |
| 2008/0081247 | A1 * | 4/2008 | Nakaishi | H01M 8/0273 |
| | | | | 429/72 |
| 2008/0199761 | A1 * | 8/2008 | Heystek | H01M 4/881 |
| | | | | 429/514 |
| 2010/0045312 | A1 * | 2/2010 | Pechstein | F16J 15/062 |
| | | | | 324/722 |
| 2010/0203402 | A1 * | 8/2010 | Na | H01M 8/04201 |
| | | | | 429/415 |
| 2013/0089767 | A1 | 4/2013 | Blacker et al. | |
| 2013/0266829 | A1 * | 10/2013 | Cole | H01M 8/184 |
| | | | | 429/51 |

FOREIGN PATENT DOCUMENTS

| | | | | |
|---|---|---|---|---|
| JP | 2006324129 A | * | 11/2006 | |
| JP | 2010198818 A | * | 9/2010 | |
| WO | WO 2013095380 A1 | * | 6/2013 | H01M 8/188 |

OTHER PUBLICATIONS

Kanno, JP 2000 260460, Machine Translation (Year: 2000).*
Choi et al., "Analysis of the Oxidation of the V(II) by Dissolved Oxygen Using UV-Visible Spectrophotometry in a Vanadium Redox Flow Battery", Journal of The Electrochemical Society, 160 (6) A973-A979 (2013) (Year: 2013).*
Shigematsu, Redox Flow Battery for Energy Storage, SEI Technical Review, No. 73, Oct. 2011, pp. 1-13 (Year: 2011).*
Kurisawa JP 2010198818 Machine Translation (Year: 2010).*

* cited by examiner

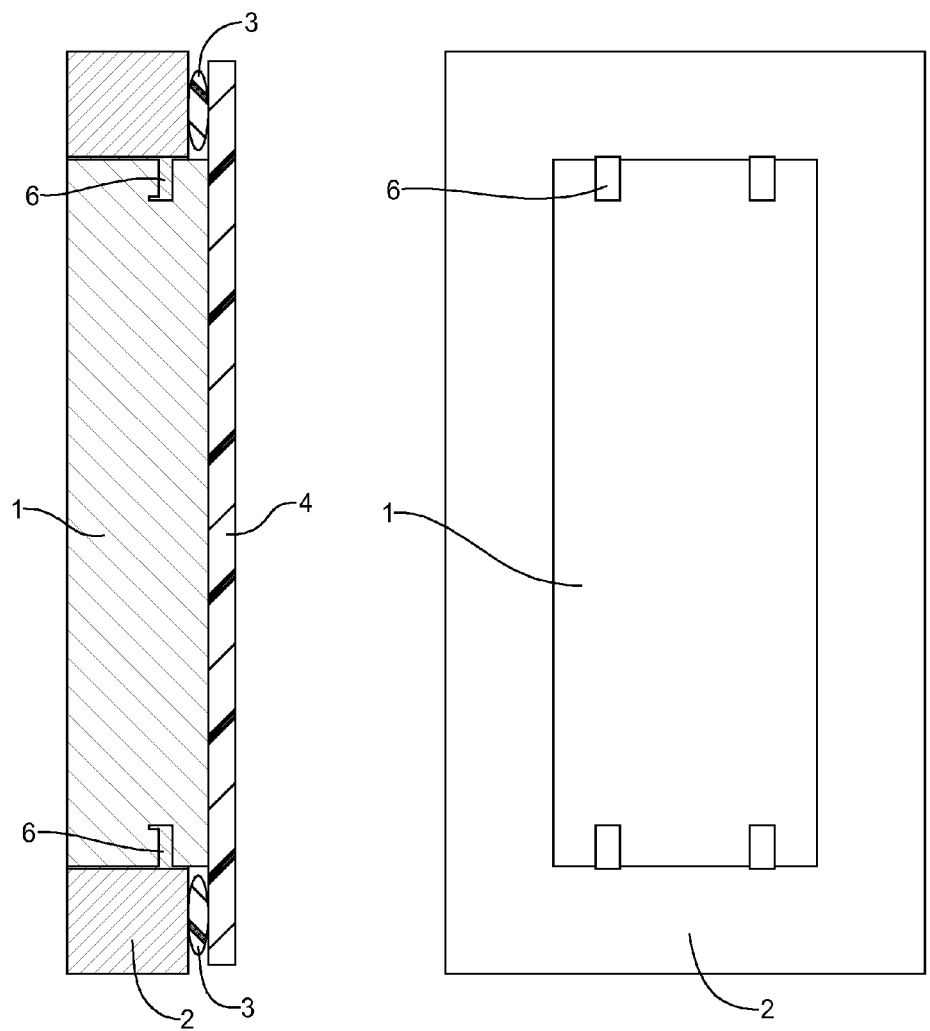
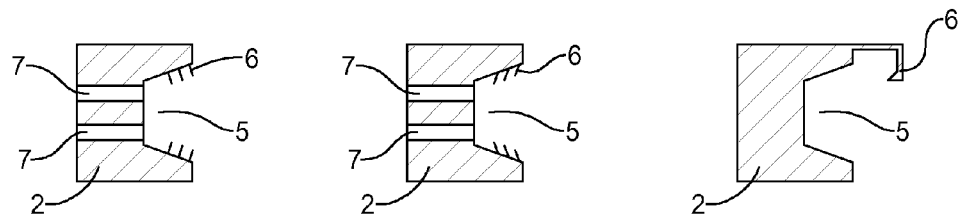
FIG 5

SEALING FRAME FOR A REDOX-FLOW BATTERY ELECTRODE MODULE

CROSS-REFERENCE TO RELATED APPLICATIONS

This application claims the benefit and priority of German Patent Application No. 10 2013 009 629.4, filed Jun. 10, 2013. The entire disclosure of the above application is incorporated herein by reference.

FIELD

The present disclosure relates to an electrode module for a redox-flow battery.

PRIOR ART

Decentralized energy supplies require new concepts. With this as a background, redox flow batteries or redox flow cells are already known.

A redox flow battery or redox flow cell, where "red-" stands for reduction, thus absorption of electrons, and "-ox" for oxidation, thus electron emission, is a storage battery.

This battery or cell stores electrical energy in chemical compounds in that the reaction components are present in a solution in a dissolved or slurry form.

Two energy-storing electrolytes circulate in two separate circuits, between which in the cell, by means of a membrane, ion exchange is occurring. The cell voltage is given by the Nernst equation and is between 0.8 and 2.2 V in practical systems.

The energy-storing electrolyte is stored outside the cell in separate tanks. Thus this cell is the sole type of electrochemical energy storage media in which the amount of energy and the power can be scaled independent of each other.

The capacity of the battery system is ultimately determined via the tank size. The capability to absorb and release power is determined via the surface of the electrodes as well as their specific current pickup and release.

The current surface currents in electrodes are below 100 $mA/cm^2$. In principle in this regard a possibility exists to assemble many smaller modules or fewer large modules.

Smaller modules consist of electrode surfaces whose format is smaller than about A3. Such modules are used for battery systems for covering energy needs in "hour scale."

For intermediate storage of renewable energy in which an energy storage device can be converted overnight from a wind turbine, the capacity or power uptake can be roughly estimated as follows:

An example of a wind turbine with a power of 2 MW/10 hours/load-power efficiency=90% results in a maximum necessary capacity of 18 MWh and thus in a maximum necessary power uptake of 1.8 MW.

Large modules possess electrode surfaces that are markedly larger than the A3 format. Such modules are especially interesting for storage plants with capacities >>50 MWh, for example for an interruption-free power supply for cities or as a chemical alternative to pumping storage power plants.

A galvanic cell is divided by a membrane into two half-cells. An electrolyte flows along the membrane. A half-cell is delimited by electrodes on which the actual chemical reaction, namely reduction or oxidation, takes place.

The membrane as a rule is a selective anion or cation exchange membrane, for example Du Pont's Nafion.

The membrane should prevent mixing of the two electrolytes, but ensure ion exchange. A charge balancing of the electron flux should be ensured by the consumer load. The ion transfer through the membrane compensates the electron flow through the consumer load.

Due to their high electrochemical voltage window, as well as the mostly acidic conditions in aqueous solution, the electrodes as a rule consist mostly of graphite or carbon. For as high a specific power as possible, graphite felts or non-wovens or carbonized felts or non-wovens with a high specific surface are used as the electrode material.

The felts are used as a rule in sealing frames. These sealing frames are in turn compressed on both sides onto the membrane. To attain the sealing action, the sealing frames are equipped with an encircling seal, especially a sealing cord applied by a bead application, or a stamped, non-profiled flat gasket.

A problem with this is that the seal is compressed from both sides onto a relatively thin membrane, the thickness of which as a rule is less than 1 mm.

With seal offsets, that can occur through manufacturing tolerances with stack assembly, the result can be an unintended distortion of the membrane, through which the membrane can be permanently damaged.

In addition, it is not possible to adjust the seal to varied local circumstances. Additionally, it is not possible to have seal profiles inward or seal applications inward.

The particular electrode solution, especially electrolyte with vanadium salts, flows as a rule along a plane through the electrode layer.

What is essential with this is good homogeneity of the flow, namely that no areas in the electrode materials appear that are not rinsed. Minimum flow loss and pressure drop are also strived for, since by that means the efficiency of the system is improved.

Nonetheless, a sufficiently long dwell time is desired, so that the dissolved salts can be oxidized or reduced quantitatively and without problems.

From this the following technical challenges result:

There is a need for sealing frames capable of mass production with a service life of at least 10 years. No chemical decomposition of the materials used should occur.

The sealing frames should resist pressure oscillations, especially during startup procedures or possible blockages in the flow system.

The sealing frames should be resistant to vibrations that are caused for example by pumps.

The sealing frames should be easy to assemble in regard to electrodes in sealing frames or in regard to stacks.

It should be possible to do a placement of a porous electrode that has long-term stability. No liquid flows should pass around the electrodes without passing through it.

With an intentional good rinsing action, a felt or a graphite non-woven or a carbonized non-woven or a carbonized felt has flow impinging on it at high fluid overpressure. By this means—primarily with possible pressure surges—it can be compressed upward in the stack. Then a cell is no longer capable of functioning.

Too tight securing of the felt or non-woven material—due for example to excessively strong clamping—results in increased flow resistance and thus to a lessening of the power charging or discharging capacity of the cell.

In addition, it must be ensured that the fleece material tightly adjoins the sealing frame in the side areas, so that no flow path of the electrolyte solution around a felt/non-woven electrode can occur.

This is all the more important in that the flow resistance around the electrode is markedly lower than through the fibrous electrode. An electrode of fleece that does not suitably adjoin in the frame consequently results in a considerable reduction in the efficiency of the battery system.

During assembly of sealing frames and electrodes, it therefore must be assured that the electrode sits in the sealing frame with no clearance, is not compressed too severely, and nonetheless cannot be shifted, folded or rinsed away by electrolyte flowing in the plane.

In addition, the seal and the sealing frame must be configured so that in the later stack, the mechanical loading onto the thin membrane cannot lead to non-uniform loading of it.

SUMMARY

Therefore the task that is the basis of the disclosure is to connect an electrode with a sealing frame in such a way that the electrode module thus produced can be used with no problems in redox flow cells.

According to the present disclosure, at the outset it is perceived that, to perform its function, an electrode must exhibit high openness or porosity. It has been recognized that an electrode can be mechanically connected with a sealing frame. What is surprising in this is that despite mechanical attachment of the electrode, its porosity is not negatively impaired. In this respect an electrode is connected with a sealing frame so that the electrode module thus produced can be used with no problems in redox flow cells.

Consequently, the problem named at the outset is solved.

The electrode could include a felt or non-woven which in the sealing frame manifests a porosity that is 20% to 95%, preferably 50% to 95% of its porosity in its uncompressed state. In fact, ideally a fleece is not compressed, to manifest high porosity, but with this there arises a high level of danger that the fleece will shift in the sealing frame.

Therefore the electrode or the fleece is mechanically fixed. The electrode however is compressed to an extent that its porosity is almost not impaired. Ultimately a flow rate of typically more than one liter per minute should be achieved by a sealing frame.

With this as a background, a seal could be placed on the sealing frame. Through this specific configuration, the sealing frame could be applied on a membrane or on an additional sealing frame. The seal can be configured as a surrounding sealing cord or as a sprayed-on seal.

On the sealing frame, a multi-lip seal or gasket could be placed. By this means, the sealing action is further improved, and mechanical pressure onto the membrane could be adjusted to be more uniform.

In the sealing frame, a surrounding channel could be configured. A surrounding channel permits a nonwoven to be joined with slight pressure. The nonwoven or felt can be inserted into the channel.

The channel could be configured to converge conically outward. Through this specific configuration, the inner diameter of the channel tapers down, so that an electrode or a fleece remains largely uncompressed in the interior of the frame, but is slightly compressed together in its edge areas.

The channel could exhibit an undercut profile. Due to the undercut, the electrode is only partially compressed, and otherwise exhibits a very high porosity. Through an undercut, in sections a linear compression could be attained which fixes the electrode or the fleece in the sealing frame.

A clawing element could be assigned to the sealing frame. A clawing element can engage into the electrode and fix it tightly. The clawing element could be configured as a hook, Velcro closure, larger hook, smaller hook, teeth or toothing within a channel. The clawing element or elements could form barbs that prevent the electrode from coming loose from the sealing frame.

In or on the sealing frame, at least one channel could be configured for electrolyte transport. Electrolytic fluid can be directed through such a channel.

In the channel, a filter element for an electrolyte can be situated. Through a filter element, suspended particles and impurities could be filtered out of the electrolyte.

The channel could project into the electrode as a protuberance. Through this specific configuration, the electrode can be directly supplied with a fluid. The fluid can be brought very specifically into the interior of the electrode.

The sealing frame could be acid-resistant or at least be coated with an acid-resistant plastic in those areas that have contact with a fluid. The sealing frame can exhibit, for example, polyolefin or also polyester or polyoxymethylene. The sealing frame could exhibit additional thermoplastics resistant to acid and oxidation like PPS.

Two electrodes could be accommodated in the sealing frame. Through this specific configuration a sandwich-style arrangement of two electrodes in a sealing frame is possible.

The channels of the sealing frames could align with each other and be connected to conduct fluid. Through this specific configuration a fluid can be pumped simultaneously by means of a pumping device through multiple sealing frames. For this a seal is necessary in a connecting sleeve.

Between the sealing frames, a membrane could be positioned to which seals could be assigned which adjoin the sealing frames. Such a membrane can be used to implement a stacked structure. The seals on the membrane and/or on the sealing frames could be sprayed, glued or cast.

In addition, in the sealing frames, elements for electrolyte inflow and outflow could be integrated, which ensure that the particular electrolytes are introduced into or removed from the sealing frames. With this in turn, the uniformity of inflow and outflow ensures the cell's power capability.

The seal could exhibit EPDM or FKM or additional polymers with resistance against acidic and oxidizing conditions. The seal can also exhibit thermoplastic elastomers such as TPE based on polyolefin.

With smaller sealing frame geometries, two-component frames or profiled flat seals are conceivable, which are incorporated loss-free into sealing frames.

With large frame geometries, namely larger than A3 format, a sealing cord or profile is conceivable as a seal, which is applied in and/or on the sealing frames. The profile could, for example, be placed into designed grooves.

An integrated electrode, namely an open-pored structure made of carbon and/or graphite, nonwoven material, felt, paper or foam could be provided.

An adjustment of the electrode could be provided while avoiding transient passing flow.

Conical notches could be provided in the sealing frame. A soft seal could be provided in this area.

An undercut profile could be provided, so that the electrode can be easily inserted into the sealing frame during assembly.

The electrode could be secured with a hook integrated in the sealing frame. At least on the side of flow impingement, but better also on the sides, the electrode could be secured by Velcro locking elements.

The securing could be accomplished in such a way that the electrolyte solution flowing in or out can flow neither above and/or below nor laterally to the electrode. The joint of the electrode to the frame should avoid a by-passing of the electrolyte around the electrode.

The seal on the sealing frame could be configured to be as wide as possible, so that during compression, even with manufacturing tolerances, an overlapping area of two opposite sealing frames onto the flexible membrane lying between is always present.

A multi-lip design could be provided. An inflow and outflow of electrolyte could be integrated into the sealing frame. For this boreholes, a wide shaft, nozzles and/or channels with an integrated seal could be provided in the inlet and/or outlet sections.

The placement could be so chosen that the felt/nonwoven has flow impinging on it in the plane. A holding function could be integrated into a nozzle or protuberance, which ensures that the felt/nonwoven has flow impinging on it centrally in cross section. Such an element ensures that exactly in the location where the greatest loading occurs when flow passes through, the felt/nonwoven is optimally held.

Other configurations for the inflow and outflow are conceivable. The inlet could be configured as a nozzle, and the outlet as a plenum channel.

Insertion pieces could be integrated into the sealing frames.

There could exist a connection to the adjoining sealing frame.

A connection could exist to a carrier and/or tube, through which the electrolyte solutions flow.

An integrated, if necessary easily replaceable filter, namely a fabric or nonwoven network insert, could be provided.

An integrated sensory device could be provided, which detects temperature, pressure, leakage and/or blockages by contaminating particles.

Intelligent controls could be provided.

DRAWINGS

Shown in the drawings are:

FIG. 4 is a side view and a top-down view of an electrode module, in which clawing elements are provided which fix the electrode;

FIG. 5 shows three sectional views of sealing frames to each of which various clawing elements are attached;

Figure 10:
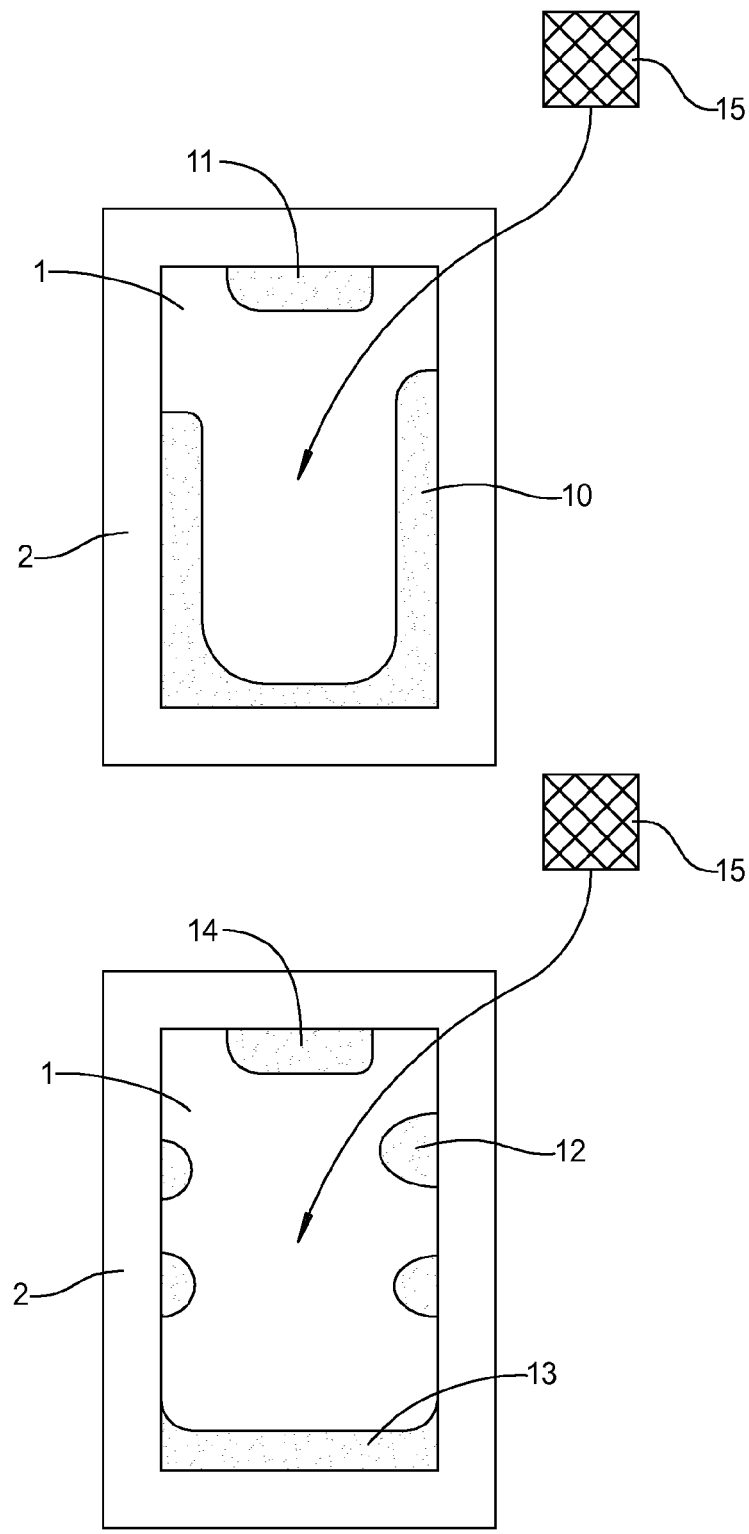
Figure 11:
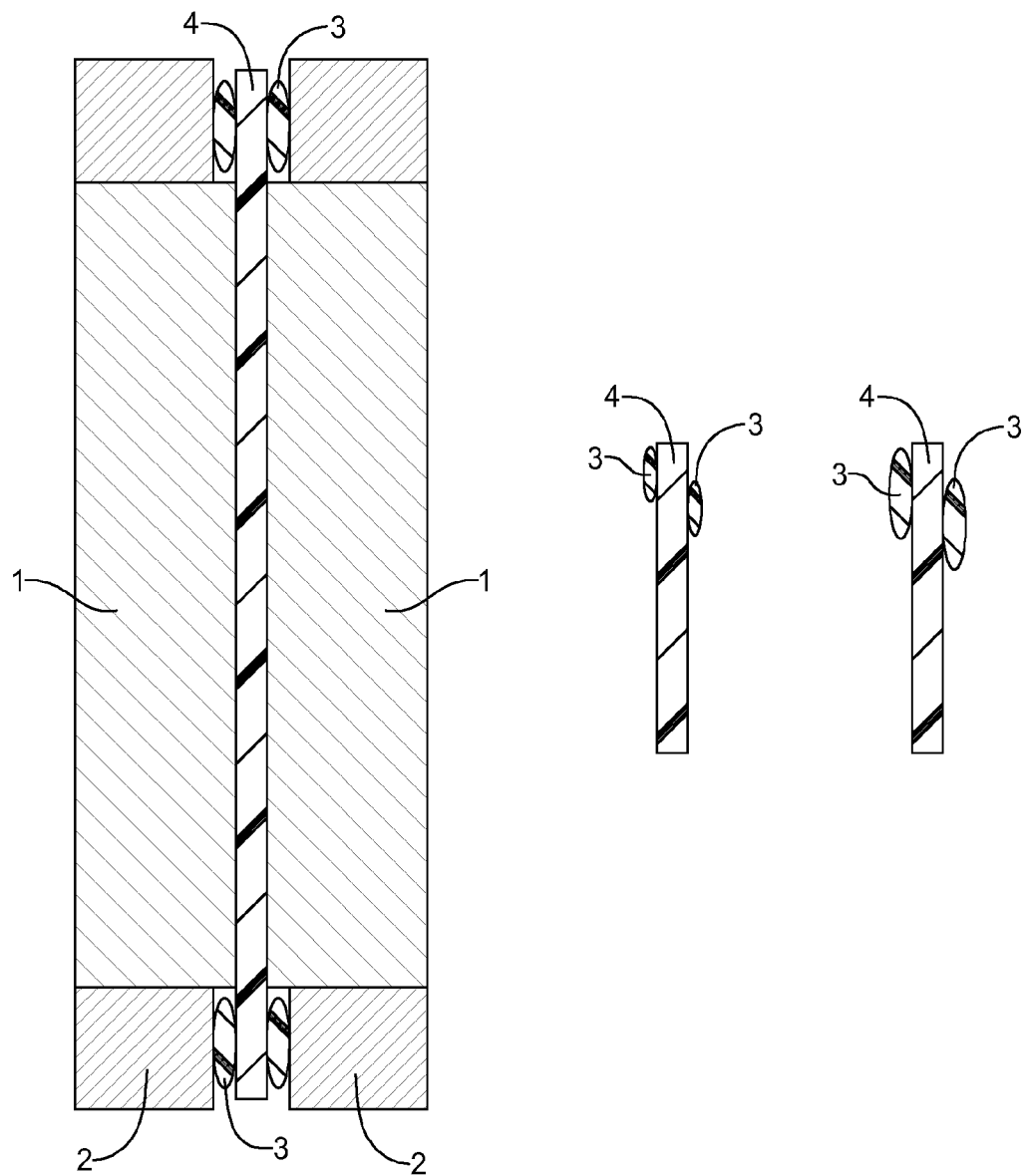

FIG. 10 shows two electrode modules, in which the securing surfaces for the electrode are depicted schematically; and FIG. 11 shows in the left view, an arrangement made of two electrode modules, between which a membrane is placed; in the center view a section of a membrane on which bilaterally offset seals are situated; and in the right view another section of a membrane, on which very flat seals are situated bilaterally, slightly offset.

DETAILED DESCRIPTION

Figure 1:
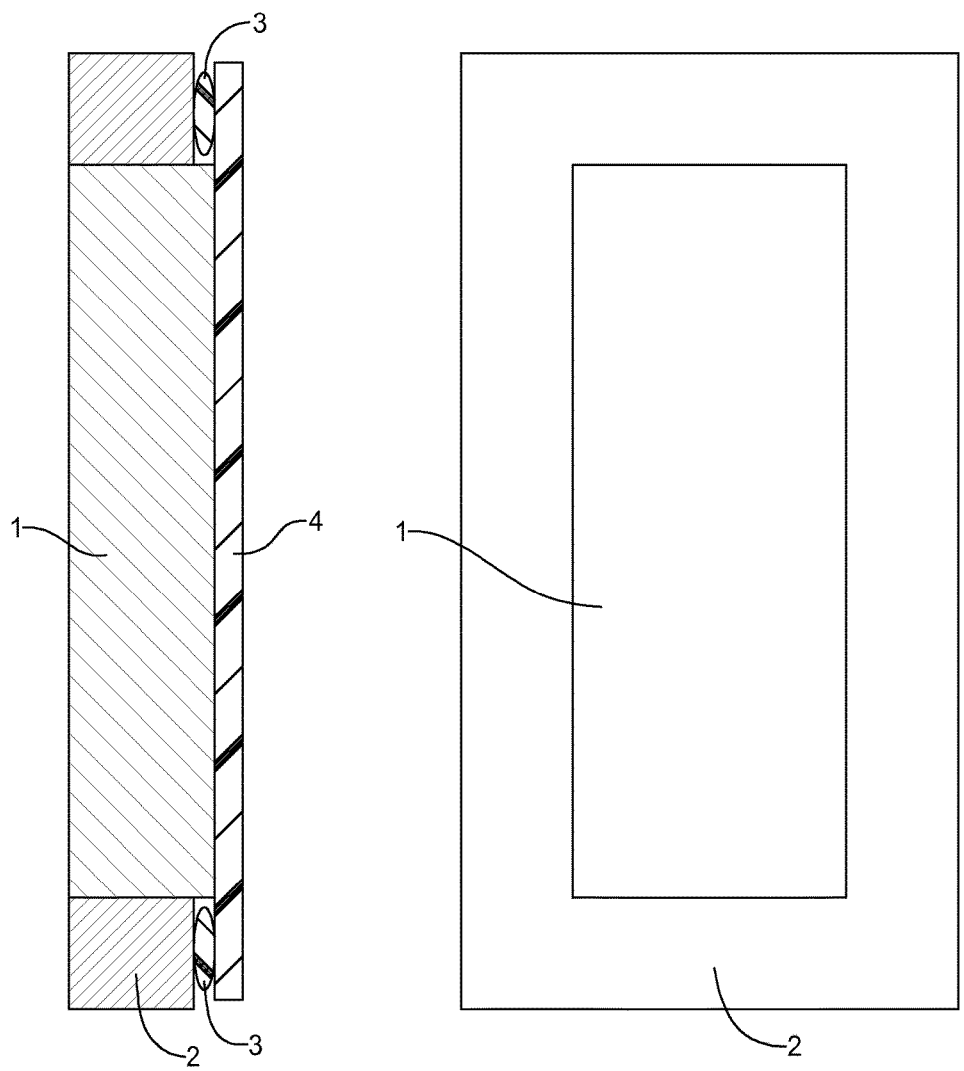
FIG. 1 is a side view and a top-down view of an electrode module, wherein in the left depiction of FIG. 1 a membrane is shown, which lies on the sealing frame.

FIG. 1 shows in the left view a sectional view of an electrode module for a redox flow battery, comprising an electrode 1 and a sealing frame 2. The electrode 1 is mechanically connected with the sealing frame 2.

The right view of FIG. 1 shows a top-down view onto the electrode module.

The electrode 1 exhibits a nonwoven, which in sealing frame 2 exhibits a porosity that manifests 20% to 95%, preferably 50% to 95%, of its porosity in an uncompressed state.

In the left view as per FIG. 1 is shown that on sealing frame 2 a seal 3 is arranged. The seal 3 also adjoins a membrane 4.

Figure 2:
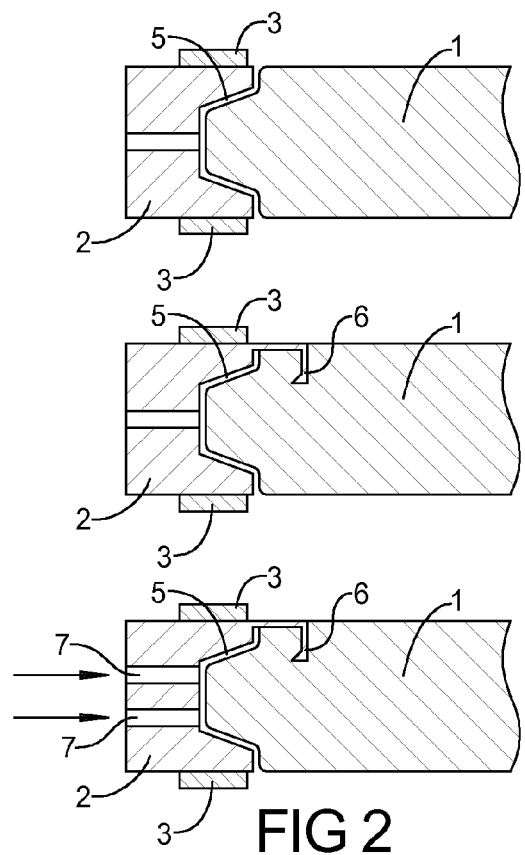
FIG. 2 shows three electrode modules, in which the sealing frame is provided with a channel.

FIG. 2 shows in the upper view a sealing frame 2, on which a seal 3 is placed bilaterally. The sealing frame 2 exhibits a channel/groove 5. In this regard in the sealing frame 2 a surrounding channel 5 is configured. The channel 5 is configured to converge conically outward.

In the center view of FIG. 2, a sealing frame 2 is shown, which exhibits a clawing element 6. The clawing element 6 is configured as a hook, which engages into the electrode 1.

In the bottom view of FIG. 2, a sealing frame 2 is shown in which multiple channels 7 are configured. The sealing frames 2 according to FIG. 2 are about 5 mm high, wherein a channel 7 exhibits a diameter of about 2 mm.

Figure 3:
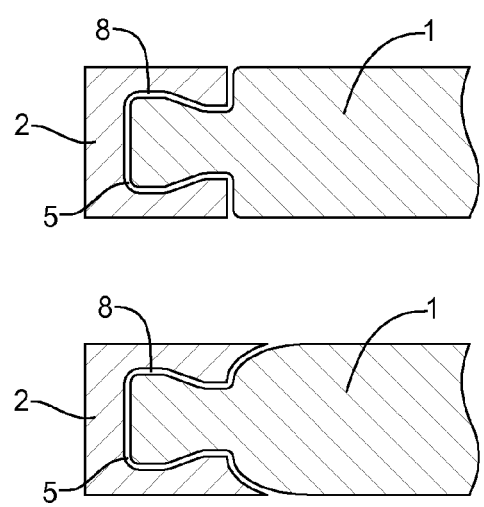
FIG. 3 shows two electrode modules, in which the sealing frames are provided with an undercut section.

FIG. 3 shows sectional views of two sealing frames 2, each of which has channels 5, that are provided with an undercut section 8.

FIG. 4 shows an electrode module which exhibits a clawing element 6 which is configured as a hook and projects into the interior of the electrode 1.

FIG. 5 shows three sectional views of sealing frames 2 in each of which channels 5 are configured, wherein at least one clawing element 6 is assigned to each sealing frame 2.

In the left view as per FIG. 5, small hooks in the manner of a Velcro enclosure are situated as the clawing elements 6.

In the center view as per FIG. 5, small hooks are configured as barbs. These hooks form the clawing elements 6.

In the right view as per FIG. 5, a large hook is provided as a clawing element 6, which projects in from an upper edge of sealing frame 2 into the flow-through plane of electrode 1.

Figure 6:
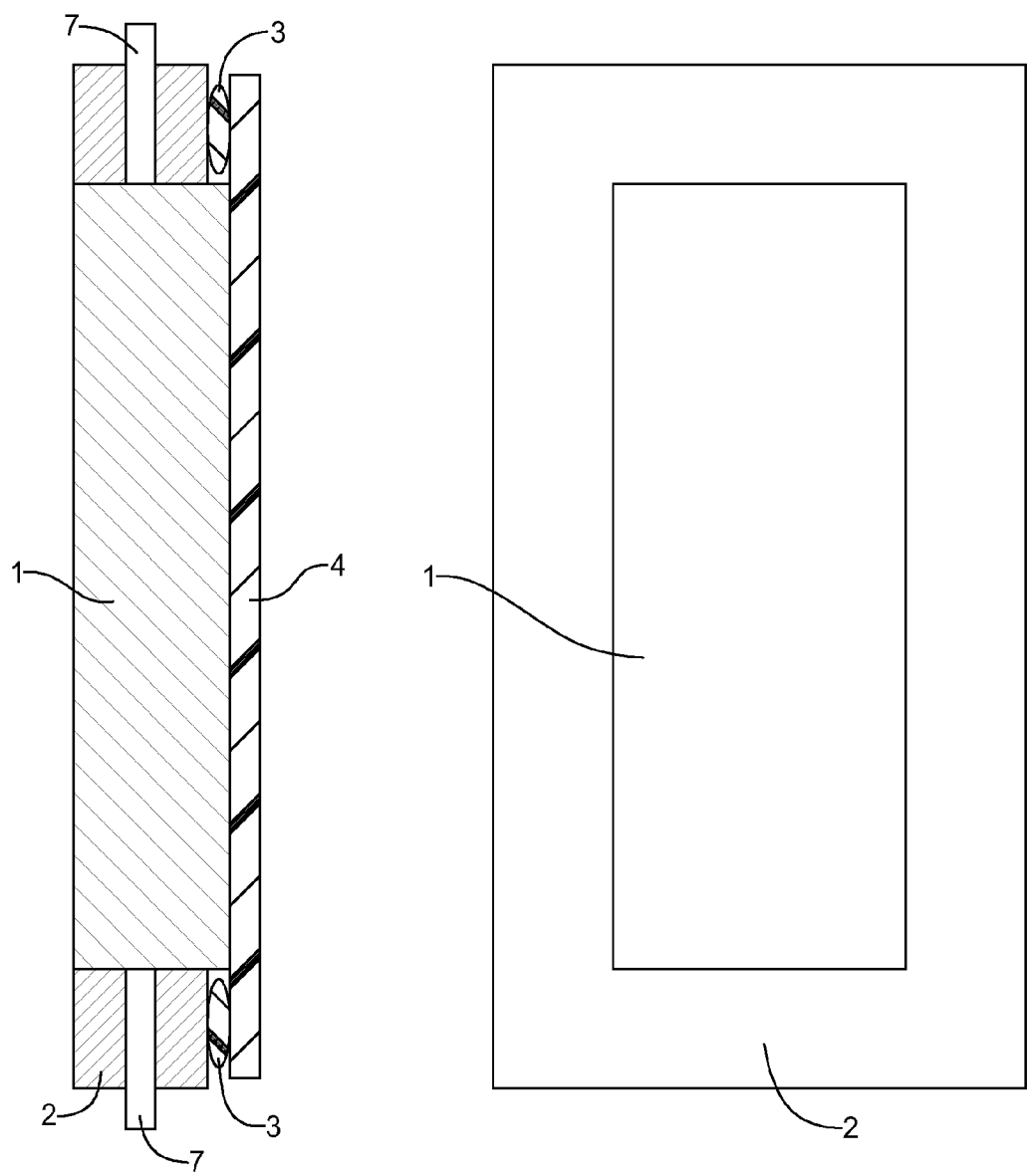
FIG. 6 is a sectional view and a top-down view of an electrode module, containing a sealing frame in which channels are configured.

FIG. 6 in the left view shows an electrode module with a sealing frame 2, in which a channel 7 is configured. The right view as per FIG. 6 shows a top-down view of this electrode module.

Figure 7:
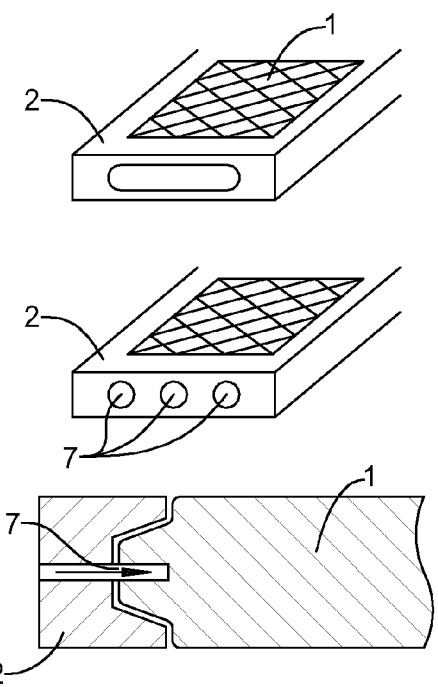
FIG. 7 shows three perspective views of various electrode modules.

FIG. 7 shows several electrode modules in a perspective view. In the top view as per FIG. 7, an electrode module is shown, in which the sealing frame 2 is coated with polyoxymethylene, a thermoplastic elastomer, a polyolefin or polyester. By this means the sealing frame 2 is coated with an acid-resistant plastic in those areas that are in contact with a fluid.

In the center view as per FIG. 7, a sealing frame 2 is shown in which three channels 7 are configured.

In the bottom view as per FIG. 7, a sealing frame 2 is depicted, which exhibits a channel 7, which projects into the electrode 1 as a protuberance.

Figure 8:
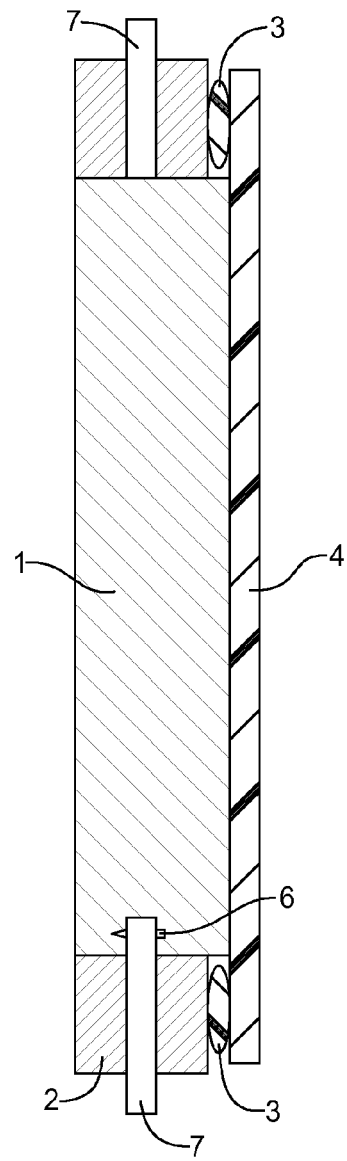
FIG. 8 is an electrode module in which in the sealing frame channels are configured, wherein the electrode is connected with the sealing channels by clawing elements.

FIG. 8 shows an electrode module, with sealing frames 2 in which channels 7 are configured, wherein the electrode 1 is connected with the channels 7 by clawing elements 6. The channels 7 project into the interior of the electrode 1 as protrusions and are engaged simultaneously with the electrode 1.

Figure 9:
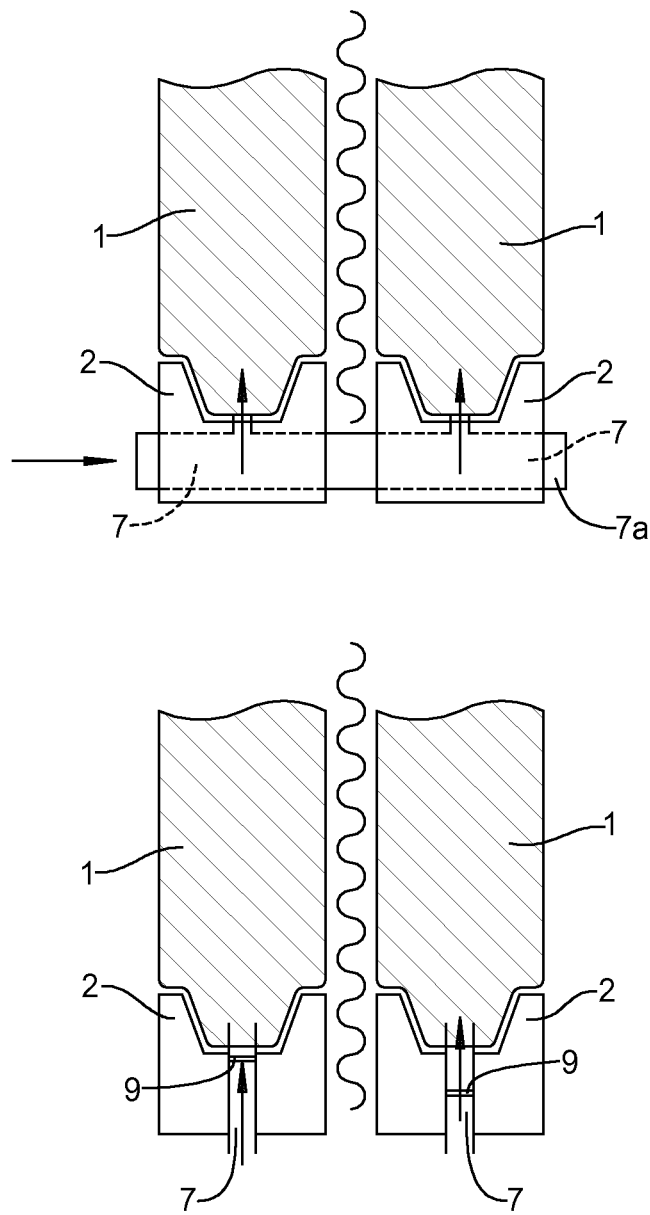
FIG. 9 shows in the top view, two electrode modules, the channels of which are aligned, and in the bottom view two electrode modules, which are situated next to each other, and in which filter elements are situated in the channels.

FIG. 9 shows an arrangement comprising at least two electrode modules of the type described here, wherein two sealing frames 2 adjoin each other in alignment.

In the top view as per FIG. 9 is depicted that the channels 7 of sealing frames 2 align with each other and are connected so as to conduct fluid. Through the channels 7 a line 7A is inserted, which not only connects the sealing frames 2 with each other, but also forms a joint channel for a fluid.

In the bottom view as per FIG. 9, channels 7 are provided which project into the plane of electrode 1, namely into the felt/nonwoven plane, and are oriented parallel to it. In the channels 7 optionally a filter element 9 for an electrolyte can be situated.

The channels 7 can be linked onto tubes with seals.

In the top and bottom views, FIG. 10 shows an electrode module in which the electrode 1 is mechanically secured by attaching surfaces 10 to 14 in a sealing frame 2. The attaching surfaces 10 to 14 reduce the effective flow-through surface 15 of electrode 1.

In the left view of FIG. 11 two electrode modules are shown which enclose a membrane 4 between them. A seal 3 is placed between the membrane 4 and the two sealing frames 2.

The center view as per FIG. 11 shows that the seals 3 are arranged to be offset to each other.

The right view as per FIG. 11 shows that flat seals 3 are situated largely offset to each other, on different sides of the membrane 4.

The use of multi-lip seals is also conceivable.

The invention claimed is:

1. An electrode module for a redox-flow battery, comprising an electrode (1) and a sealing frame (2), wherein the electrode (1) is mechanically connected to the sealing frame (2), wherein a clawing element (6) having a hook-shaped end which has a first portion extending in a first direction from the sealing frame (2) along a side surface of the electrode (1) and a laterally inwardly extending second portion extending from an end of the first portion into the electrode (1) and a third portion extending from an end of the second portion and extending in a second direction opposite to the first direction wherein the second and third portions of the hook-shaped end are embedded into the electrode (1) and the first portion, the second portion and the third portion are integrally formed.

2. An electrode module for a redox-flow battery, comprising an electrode (1) and a sealing frame (2), wherein the electrode (1) is mechanically connected to the sealing frame (2), wherein at least one channel (7) for electrolyte transportation is formed in the sealing frame (2), wherein a filter element (9) for an electrolyte is arranged in the channel (7) within the sealing frame.

3. An electrode module for a redox-flow battery, comprising a porous electrode (1) and a sealing frame (2), wherein the porous electrode (1) is mechanically connected to the sealing frame (2), wherein at least one channel (7) for electrolyte transportation is formed in the sealing frame (2), wherein the channel (7) projects into the porous electrode (1) in the form of a protuberance.

* * * * *